Oct. 11, 1932.  R. F. PEO  1,881,958
JOINT
Filed Jan. 21, 1931  2 Sheets-Sheet 1
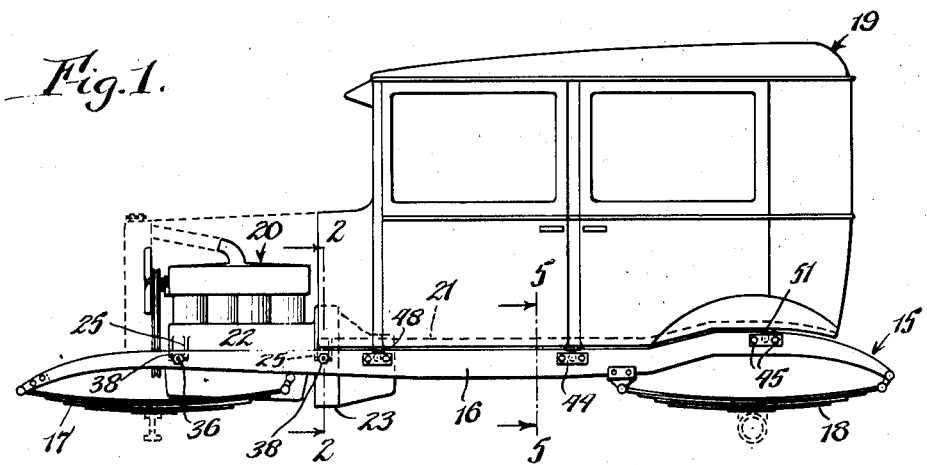
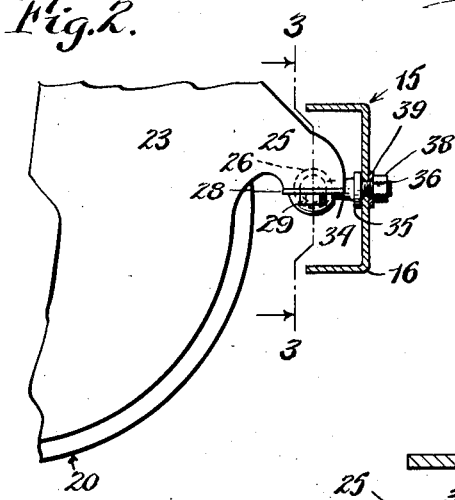
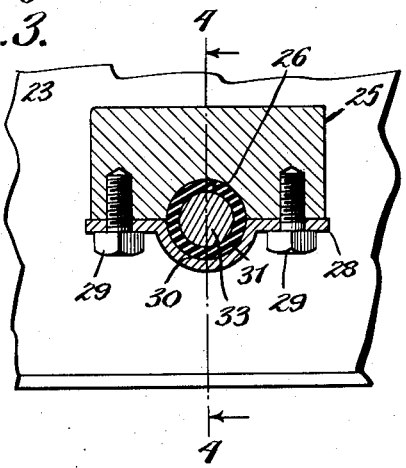
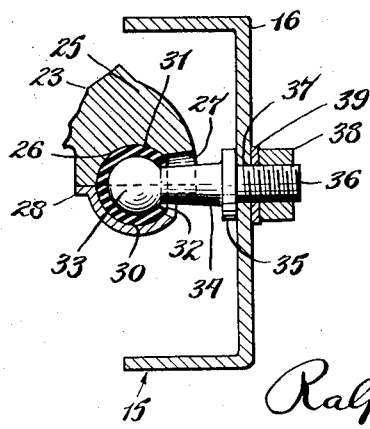
Inventor
Ralph F. Peo
By Popp and Powers
Attorneys Oct. 11, 1932.  R. F. PEO  1,881,958

JOINT

Filed Jan. 21, 1931  2 Sheets-Sheet 2

Inventor
Ralph F Peo
By Popp and Powers
Attorneys

Patented Oct. 11, 1932

1,881,958

UNITED STATES PATENT OFFICE

RALPH F. PEO, OF BUFFALO, NEW YORK, ASSIGNOR TO HOUDE ENGINEERING CORPORATION, OF BUFFALO, NEW YORK, A CORPORATION OF NEW YORK

JOINT

Application filed January 21, 1931. Serial No. 510,147.

This invention relates to a coupling or joint and more particularly to a coupling for mounting automobile bodies and motors on the chassis of the automobile with a vibrationless silencing joint, so that noise and squeaks from this source are avoided and also vibrations are not transmitted from the road and from the motor which vibrations are injurious to the car body in loosening parts thereof.

The objects of this invention are to provide an extremely simple and inexpensive joint of this character which is readily applied to both the chassis and the body of the car, and also the motor thereof and which, when so assembled, provides a vibrationless and silencing joint so that body squeaks are avoided and also the vibrations from the road and motor are not transmitted to the automobile body.

A further aim is to provide such a body which is strong and durable in construction and which will continue to function in good order for a long period of time without requiring attention or replacement of any of the parts.

In the accompanying drawings:

Figure 1 is a side elevation of an automobile body and motor secured to the chassis of an automobile by means of vibrationless silencing joints embodying my invention.

Figure 2 is a fragmentary front elevation of the flywheel housing the motor showing the manner in which my invention is employed to connect the motor and chassis, this section being taken on line 2—2 of Figure 1.

Figure 3 is a section taken on line 3—3 of Figure 2.

Figure 4 is a section taken on line 4—4 of Figure 3.

Similar reference numerals refer to like parts in each view.

Figure 5:
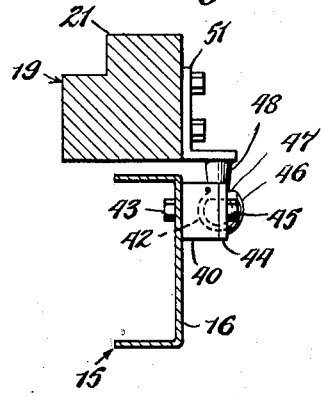
Figure 5 is a transverse section through the chassis and body of the automobile on line 5—5 of Figure 1 and showing the manner in which my invention is employed to provide a vibrationless silencing joint between the automobile body and the chassis.

The automobile body shown in the accompanying drawings can be of any usual and well-known construction but as shown consists of a chassis 15 composed of a pair of longitudinal channel bars 16 which channel bars are connected together in any suitable manner (not shown). These channel bars 16 are supported by the front and rear springs 17 and 18 which carry the axles and on these bars 16 are mounted the automobile body 19 and the motor 20. The automobile body can be of any suitable construction and, as shown, comprises longitudinal sills 21 which are arranged above the channel bars 16 of the chassis and carry the frame work of the body. The motor includes a cylinder block 22 having an integrally formed flywheel casing 23 and is supported by legs 25 which project laterally outwardly from the cylinder block and from the fly-wheel housing and are adapted to be connected to the channel bars 16 in the following manner:

Each of the legs 25 is hollowed out on its under side to provide a semi-spherical recess 26 and extending from the outside of the leg 25 to this recess is an inverted U-shaped groove or recess 27. To the bottom of the leg 25 is secured a plate 28, this plate being secured in place by screws 29 and being formed to provide a semi-spherical recess 30 on its upper side. The plate when secured in position on the leg 25 in cooperation with the recess 26 provides a spherical cavity which forms a socket. In this socket is arranged a hollow rubber sphere 31 which has an opening 32 on the side adjacent the channel bar 16. In this hollow rubber sphere 31 is fitted a ball 33 which is formed integrally with a stem 34. This stem has a collar 35 formed thereon and on the opposite side of the collar 35 the stem is threaded as indicated at 36 and passes through an opening 37 in the channel bar 16. The stem 34 is held in position by a nut and lock washer 38 and 39 which clamp the collar 35 against the channel bar 16. Each of the legs 25 of the motor is so provided with ball and socket joint in which a hollow sphere of rubber is provided between the ball and the socket to take up vibration and to provide an absolutely solid joint between the motor and the chassis.

Figure 6:
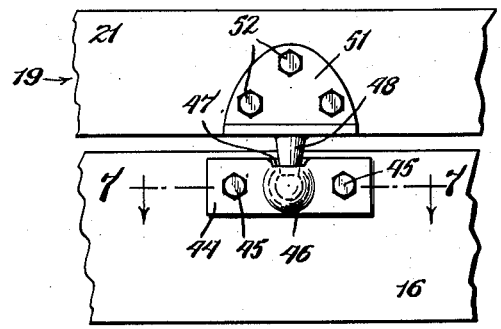
Figure 6 is a side elevation of the form of the invention shown in Figure 5.
Figure 7:
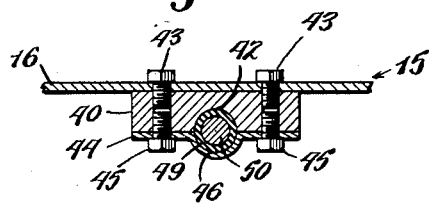
Figure 7 is a section taken on line 7—7 of Figure 6.

In securing the body to the chassis each part of the ball and socket joint is preferably made as a separate unit and applied to the sills and channel bars 16 of the body and chassis. As best shown in Figures 5 and 6 and 7 the socket member is made in the form of a cast metal block 40 which is formed to provide a semi-spherical recess 42 and is secured to the corresponding channel bar 16 of the chassis by screws 43 which pass through the channel bar and engage threaded openings in the socket block 40. Over this socket block 40, a plate 44 is secured by screws 45 and is formed to provide a pocket 46 which, together with the socket 42 of the recess block 40, forms a spherical socket. Both the block 40 and the plate 44 are formed so that a mouth 47 is provided to permit the stem 48 of the ball member to work back and forth. The spherical socket formed by the recess 42, and the pocket 46 has fitted therein a hollow rubber sphere 49, this sphere having an opening which permits the insertion of the ball 50 at the end of the stem 48. The upper end of the stem 48 is formed to provide an L-shaped attaching flange 51 which is secured to the corresponding longitudinal sill of the automobile body by means of screws 52 or the like.

It will be observed from Figure 4 that the head that is the size of the head 33 is less than the size of the opening 27 in the socket member so that the hollow rubber sphere or shell, in addition to serving as a cushioning means between the head and socket member, at the same time serves to retain the head and socket member against displacement in service.

It is apparent that when a number of such ball and socket joints are provided between the body 19 and chassis 15, as best shown in Figure 1, the body is adequately supported and connected to the chassis and at the same time the hollow rubber spheres 49 take up all vibration and at the same time provide absolutely silent joints between the body and the chassis.

Figure 8:
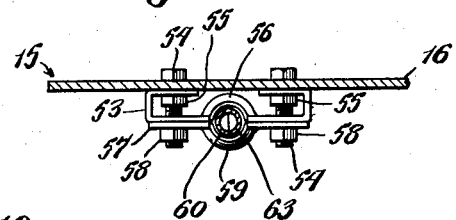
Figure 8 is a view similar to Figure 7 showing the manner in which the invention may be carried out with a pressed metal socket in place of the cast metal form shown in Figures 5–7.
Figure 9:
Figure 9 is an edge view of a pressed metal ball member for use with a pressed metal socket member shown in Figure 8.
Figure 10:
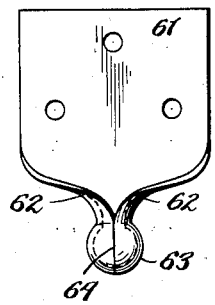
Figure 10 is a face view of the pressed metal ball member shown in Figure 9.
Figure 11:
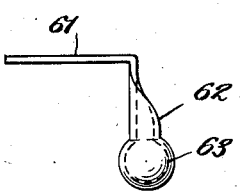
Figure 11 is a view similar to Figure 9 showing a modified form of pressed metal ball member.

In the form shown in Figures 8–10 the joint embodying the invention is made entirely of pressed metal. As shown in Figure 8 one of the socket members 53 is C-shaped in section and is held to the side of the channel bar 16 by means of bolts 54 which pass through the both sides of the C-shaped member 53 and are held in place by nuts 55. The C-shaped member 53 is formed to provide a semi-spherical central portion 56. The corresponding plate 57 is held in place by nuts 58 also fitted on the bolts 54 and is formed to provide a semi-spherical portion 59, the semi-spherical portion 56 of the C-shaped part 53 and the plate 57 forming a spherical socket. This socket is lined with the hollow rubber sphere 60 as in the other forms of this invention. The ball or head member comprises a pressed metal plate having a flat attaching portion 61 which can be welded to the sill 23 of the body or fastened in any other suitable manner. At its lower end the two edges of the plate 61 are turned or twisted toward one another as indicated at 62 and are formed to provide a ball 63, the two edges 64 of the plate meeting at the center of this ball. If desired, as shown in Figure 11, the attaching plate 61 can be arranged at right angles to the part which is formed to provide the ball 63, thereby providing a ball member which can be secured to the under side of the sill 21. It is apparent in this last form that the ball and socket members are made entirely of pressed metal and can be fabricated very inexpensively.

Figure 12:
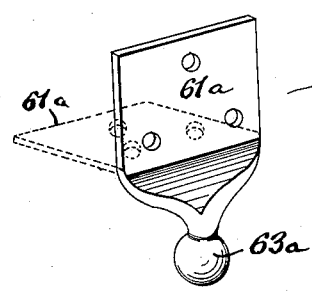
Figure 12 is a perspective view of a forged or cast pressed metal ball member conforming to the form shown in Figs. 9–11.

In Figure 12 is illustrated a forged or cast ball member conforming to the pressed metal member shown in Figs. 9–11. Except for the details incident to being cast or forged the male member shown in Fig. 12 is in every way similar to the form shown in Figs. 9–10, the form shown in Fig. 12 having a flat attaching portion 61—a adapted to be welded or riveted to the sill 23 of the body and at the lower end this flat attaching portion is formed to provide a neck and ball 63—a. As shown by dotted lines in Fig. 12, the attaching plate 61—a can be arranged at right angles to the part forming the ball 63—a.

All of the forms of the invention provide a vibrationless or silencing connection adapted for securing the motor and body of a vehicle to a chassis, which joint is very inexpensive in construction, can be readily assembled, and applied to the chassis and body of an automobile and when in operation provides a joint that is noiseless and prevents the transmission of vibrations from the chassis to the body and from the motor to the chassis. The joint also requires practically no attention and will remain in good working condition for a long period of time.

I claim:

1. In a joint of the character described for connecting two members, and including a spherical two part socket member rigidly connected to one of said members, a pressed metal attaching plate adapted to be rigidly connected to the other of said members, the outer end of said attaching plate being bent to form a substantially tubular stem and a ball at the end of said stem, said ball adapted to be fitted in said socket and a hollow rubber sphere interposed between said ball and socket and forming the sole connecting means between said ball and socket.

2. A joint of the character described for connecting two members, comprising a ball member rigidly connected to one of said members, a C-shaped pressed metal member formed on its outer face to provide a half socket, a plurality of bolts passing through said C-shaped member and the other of said members, a nut on each of said bolts and each engaging an inner face of said C-shaped member to secure it rigidly to said other of said members, a pressed metal plate fitted over said bolts and engaging the outer face of said C-shaped member and being formed to provide a half socket forming with said C-shaped member a spherical socket receiving said ball, nuts on said bolts and engaging the outer face of said plate to hold it to said C-shaped member and a hollow rubber sphere interposed between said ball and socket member and forming the sole connecting means therebetween.

In testimony whereof I hereby affix my signature.

RALPH F. PEO.